United States Patent [19]

Nakanishi et al.

[11] Patent Number: 5,532,302

[45] Date of Patent: Jul. 2, 1996

[54] FLAME RETARDANT COMPOSITION AND METHOD FOR USE IN SYNTHETIC THERMOPLASTIC RESINS

[75] Inventors: Tetsuo Nakanishi; Mitsuo Asai, both of Gunma-ken; Hiroyuki Ohata; Keiichi Uchida, both of Fukui-ken, all of Japan

[73] Assignees: Shin-Etsu Chemical Co., Ltd., Tokyo; Nissin Chemical Industry Co., Ltd., Fukui-ken, both of Japan

[21] Appl. No.: 202,630

[22] Filed: Feb. 28, 1994

[30] Foreign Application Priority Data

Mar. 1, 1993 [JP] Japan .................... 5-039685

[51] Int. Cl.$^6$ ................ C08J 5/10; C08K 5/52; C08L 25/02
[52] U.S. Cl. .............. 524/143; 524/127; 524/430; 524/444; 524/425; 524/433; 525/106
[58] Field of Search ..................... 524/127, 143, 524/430, 444, 425, 433; 525/106

[56] References Cited

U.S. PATENT DOCUMENTS

| | | | |
|---|---|---|---|
| 4,939,206 | 7/1990 | Wang | 525/63 |
| 5,266,618 | 11/1993 | Watanabe et al. | 524/405 |

*Primary Examiner*—Paul R. Michl
*Assistant Examiner*—U. K. Rajguru
*Attorney, Agent, or Firm*—Millen, White, Zelano, & Branigan

[57] ABSTRACT

An improved flame-retardant composition and method for its use are provided. The composition imparts flame retardency to synthetic thermoplastic resins to prevent dripping of the melt of the resin when the resin is burnt. The composition comprises a flame retardant agent such as phosphate ester compound, optionally combined with a metal hydroxide, and an organopoly-siloxane-based graft copolymer of a (meth)acrylic acid ester such as methyl-(meth)-acrylate. The flame retardant is used in an amount from 1–50 parts by weight per 100 parts by weight of the synthetic resin, and the graft copolymer provides 0.5 to 20 parts by weight of an organosilicone group per 100 parts by weight of the synthetic resin.

6 Claims, No Drawings

FLAME RETARDANT COMPOSITION AND METHOD FOR USE IN SYNTHETIC THERMOPLASTIC RESINS

BACKGROUND OF THE INVENTION

The present invention relates to a flame-retardant resin composition or, more particularly, to a method for imparting flame-retardancy to a synthetic resin or, in particular, thermoplastic resin to give a resin composition outstandingly safe from the troubles due to dripping of the molten composition under burning.

It is a heretofore established technology that thermoplastic resins can be imparted with flame retardancy when compounded with various kinds of flame retardant agents including halogen-containing compounds, phosphorus-containing compounds, antimony trioxide and the like either singly or as a combination of two kinds or more according to need. It is known, in particular, that a synergistically improved flame retardant effect can be obtained by the combined use of a halogen-containing compound and a phosphorus-containing compound as the flame retardant agent. The use of a halogen-containing compound or antimony trioxide as the flame retardant agent, however, has a serious problem that highly toxic gases such as hydrogen halides and antimony halides are produced when a shaped article of the resin compounded with these flame retardant agents is burnt. A solution of this problem is eagerly desired along with a high flame retardant effect in the fields of household electric appliances manufactured by using various kinds of synthetic resins compounded with a flame retardant agent free from generation of any toxic gases by burning.

In this regard, extensive investigations are now under way to discover a non-halogen compound capable of exhibiting an excellent flame retardant effect when compounded with a synthetic resin. For example, application of silicones or, namely, organopolysiloxane compounds and organosilane compounds is highlighted because silicones in general are physiologically inert and safe from generation of toxic gases under burning. Japanese Patent Kokai No. 1-108235 discloses a method according to which a metal hydroxide powder as a class of flame retardant agents is surface-treated with a silane coupling agent so as to be imparted with improved water resistance and acid resistance. Japanese Patent Publication No. 3-48947 proposes the use of a crosslinkable silicone fluid and a so-called MQ resin in combination as a non-halogen flame retardant agent in synthetic resins. Japanese Patent Kokai No. 64-14277 proposes a further combined use of a phosphorus-containing compound to the above. None of these prior art flame retardant agents, however, is quite satisfactory in respect of the preventing effect against dripping of the melt of the resin under burning. In particular, polystyrenes and styrene-based resins, which are notorious in respect of the difficulty of being imparted with a sufficiently high effect of flame retardancy not to cause dripping of the melt by compounding with conventional flame retardant agents.

SUMMARY OF THE INVENTION

The present invention accordingly has an object to provide a novel and efficient means for imparting flame retardancy to a synthetic resin or thermoplastic resin to give a resin composition which is safe from dripping of the resin melt from the resin under burning even when the resin is a polystyrene.

Thus, the method of the invention for imparting flame retardancy to a synthetic resin to give a flame-retardant resin composition comprises uniformly blending:

(a) 100 parts by weight of the synthetic resin; with (b) from 1 to 50 parts by weight of a flame retardant agent which is preferably a phosphorus-containing compound; and (c) from 0.5 to 20 parts by weight of an organosilicone group-containing acrylic resin, which is a graft copolymer of (A) an organopolysiloxane having an average degree of polymerization not exceeding 10,000 represented by the average unit formula

$$R^1_a R^2_b SiO_{(4-a-b)/2}, \qquad (I)$$

in which $R^1$ is a monovalent organic group having a radical-reactive group or a mercpato group, $R^2$ is a hydrogen atom or a monovalent hydrocarbon group having 1 to 20 carbon atoms free from a radical-reactive group and a mercpato group, the subscript a is a positive number in the range from 0.001 to 1.0 and the subscript b is a positive number with the proviso that a+b is in the range from 1.95 to 3.00; and (B) an ester of (meth)acrylic acid represented by the general formula

$$CH_2=CR_3-CO-O-R^4, \qquad (II)$$

in which $R^3$ is a hydrogen atom or a methyl group and $R^4$ is an alkyl group or alkoxy-substituted alkyl group having 1 to 18 carbon atoms, in a weight ratio of (A):(B) in the range from 5:95 to 95:5 or, preferably, from 20:80 to 80:20 or, more preferably, from 30:70 to 70:30.

DETAILED DESCRIPTION OF THE PREFERRED EMBODIMENTS

As is described above, the essential ingredients in the flame retardant resin composition obtained by the inventive method include the components (a), (b) and (c), of which the component (a) is, in particular, a synthetic thermoplastic organic resin as the base ingredient of the composition to be imparted with flame retardancy.

The synthetic thermoplastic organic resin as the component (a) is not particularly limitative including various kinds of thermoplastic resins such as polyethylene, polypropylene, polycarbonate, polyvinyl chloride and the like as well as those to which sufficient flame retardancy can hardly be imparted with conventional flame retardant agents such as general-purpose and high-impact polystyrenes and styrene-based copolymeric resins, e.g., copolymeric resins of styrene and acrylonitrile, styrene, acrylonitrile and butadiene and the like.

The component (b) used in the inventive method is a flame retardant agent which is preferably a phosphorus-containing organic or inorganic compound or other inorganic compounds known as a flame retardant agent not including antimony trioxide. Halogen-containing organic compounds are not preferable due to the problem of the toxicity of the gaseous combustion products therefrom even if they are excellent in the effect of flame retardancy.

Examples of suitable phosphorus-containing flame retardant agents include esters of phosphoric acid such as triphenyl phosphate (TPP), tricresyl phosphate (TCP) and cresyl diphenyl phosphate (CPP) and esters of polyphosphoric acid as well as inorganic phosphate compounds such as ammonium polyphosphate. These phosphate-based flame retardant agents can be used either singly or as a combination of two kinds or more according to need. As is understood, these phosphate-based flame retardant agents exhibit a flame retardant effect by the mechanism that the polyphosphoric acid formed by the thermal decomposition thereof by burning of the resinous host material has an activity for dehydration to promote carbonization of the resin along with formation of a non-volatile crust layer on the burning body. These flame retardant agents, however, are not effective to prevent dripping of the melt of the resinous material when used alone.

The low-molecular phosphate-based flame retardant agents such as TPP, TCP, CPP and the like have a relatively low thermal decomposition temperature and also act as a plasticizer when compounded in a resinous material. Therefore, use of a polyphosphoric acid ester is recommended instead thereof when the resinous material should not be plasticized or when the compounding work must be conducted at a high temperature. Ammonium polyphosphate-based flame retardant agents have an additional effect that ammonia gas is produced therefrom at high temperatures along with formation of a crust layer as mentioned above so that the oxygen concentration in the ambience is decreased by dilution with the ammonia gas to further enhance the flame retardant effect.

The amount of the above described phosphate-based flame retardant agent as the component (b) compounded with the synthetic resin in the inventive method is in the range from 1 to 50 parts by weight or, preferably, from 10 to 30 parts by weight per 100 parts by weight of the organic thermoplastic resin as the component (a). When the amount thereof is too small, the effect of flame retardancy cannot be fully obtained as a matter of course while, when the amount is too large, the shaped articles of the resin composition would suffer from a decrease in the mechanical strength along with an adverse effect on the appearance of the shaped articles.

The flame retardant agent as the component (b) is not limited to the above described phosphate-based ones alone but various kinds of inorganic non-phosphate flame retardant agents can be used in combination as an auxiliary flame retardant agent. The inorganic non-phosphate flame retardant agents are advantageous in respect of no or low toxicity, little fuming and no occurrence of corrosive or toxic gas produced by decomposition at high temperatures. Examples of suitable inorganic non-phosphate flame retardant agents include hydroxides of a metal such as aluminum hydroxide, magnesium hydroxide and the like as well as calcium aluminate, calcium carbonate, various kinds of metal oxides though with somewhat lower flame retardant effect. When permissible in respect of the toxicity, antimony trioxide can also be used as the component (b). These inorganic non-phosphate flame retardant agent can be used either singly or as a combination of two kinds or more according to need.

Among the above named inorganic non-phosphate flame retardant agents, magnesium hydroxide is the most preferable when the compounding work with the organic thermoplastic resin must be conducted by melting the resin at a high temperature. This is because the dehydration reaction of aluminum hydroxide begins at a temperature of 180° C. or higher so that foaming may eventually take place in the resin composition when the compounding work is conducted at a high temperature. In this regard, magnesium hydroxide is safe against foaming because the dehydration temperature thereof is about 350° C. to exceed the softening or plasticization temperature of most of the general-purpose thermoplastic resins currently under use.

Metal hydroxide-based flame retardant agents sometimes absorb moisture from the atmospheric air so as to cause a decrease in the electric insulation of the shaped articles of the resin composition compounded therewith. This disadvantage can be mitigated by the surface treatment of the metal hydroxide particles with an organosilane compound or with a higher fatty acid when high electric insulation of the shaped articles is particularly important.

The amount of the above described inorganic non-phosphate flame retardant agents as the component (b) compounded in the inventive resin composition is 100 parts by weight or smaller or, preferably, in the range from 30 to 80 parts by weight per 100 parts by weight of the organic thermoplastic resin as the component (a). When the amount thereof is too large, a great decrease is caused in the mechanical strengths of the shaped articles prepared from the resin composition. A synergistic effect can be obtained by the combined use of a phosphate based and inorganic non-phosphate flame retardant agents.

The most characteristic ingredient to be compounded with the synthetic resin in the inventive method as the component (c) is an organosilicon group-containing acrylic resin which is a graft copolymer of (A) a reactive organopolysiloxane having, in a molecule, at least one organic group with a radical-reactive group or an organic group with a mercapto group -SH and (B) an alkyl ester of (meth)acrylic acid, optionally, in combination with other copolymerizable monomer or monomers.

The reactive organopolysiloxane as the constituent (A) of the graft copolymer is represented by the average unit formula $$R^1_a R^2_b SiO_{(4-a-b)/2},\qquad (I)$$

in which $R^1$ is a monovalent organic group having a radical-reactive group, e.g., unsaturated group, or a mercpato group, $R^2$ is a hydrogen atom or a monovalent hydrocarbon group having 1 to 20 carbon atoms free from a radical-reactive group and a mercpato group, the subscript a is a positive number in the range from 0.001 to 1.0 and the subscript b is a positive number with the proviso that a+b is in the range from 1.95 to 3.00.

The above mentioned organic group with a radical-reactive group as a class of the groups denoted by $R^1$ includes vinyl group, allyl group, 3-(meth)acryloxypropyl group and the like. The mercapto-containing organic group as the other class of the groups denoted by $R^1$ is exemplified by 3-mercaptopropyl group and the like. The average degree of polymerization, i.e. the number of the silicon atoms in a molecule, of the organopolysiloxane is 10,000 or smaller or, preferably, in the range from 500 to 8000. When the graft copolymer is prepared from an organopolysiloxane of which the average degree of polymerization is too large, difficulties are caused in the compounding work of the graft copolymer with the organic thermoplastic resin as the component (a) and the flame retardant agent as the component (b). Any known method is applicable to the preparation of the above described organopolysiloxane.

The alkyl ester of (meth)acrylic acid to be graft-polymerized on to the above described organopolysiloxane is represented by the general formula $$CH_2=CR^3-CO-O-R^4,\qquad (II)$$

in which $R^3$ is a hydrogen atom or a methyl group and $R^4$ is an alkyl group or alkoxy-substituted alkyl group having 1 to 18 carbon atoms. Examples of the ester compound include methyl (meth)acrylate, ethyl (meth)acrylate, butyl (meth)acrylate, 2-ethylhexyl (meth)acrylate, 2-methoxyethyl (meth)acrylate, 2-ethoxyethyl (meth)acrylate and the like. These (meth)acrylate ester compounds can be used either singly or as a combination of two kinds or more according to need as the grafting monomer.

The grafting toohomer on to the organopolysiloxane is not limited to the above described alkyl (meth)acrylate ester monomers alone but can be a combination thereof with one or more of other ethylenically unsaturated monomers copolymerizable with the (meth)acrylate ester monomers. Examples of such an additional grafting monomer include unsaturated amide compounds such as (meth)acrylamide and the like, oxirane group-containing unsaturated compounds such as glycidyl (meth)acrylate and the like, unsaturated carboxyl compounds such as (meth)acrylic acid, itaconic acid, maleic anhydride and the like, hydroxyalkyl (meth)acrylates such as 2-hydroxyethyl (meth)acrylate and the like, compounds having two or more of unsaturated linkages such as 1,4-butanediol di(meth)acrylate, 1,6-hexanediol di(meth)acrylate, divinyl benzene, allyl (meth)acrylate and the like, and so on.

The graft copolymer as the component (c) of the inventive resin composition can be prepared from the above described organopolysiloxane and the grafting toohomer or monomers according to a known procedure for the emulsion polymerization. The proportion of the organopolysiloxane and the grafting monomer or monomers in the emulsion polymerization is in the range from 95:5 to 5:95 by weight or, preferably, from 20:80 to 80:20 or, more preferably, from 30:70 to 70:30. The graft co-polymer obtained by the emulsion polymerization is isolated from the polymerization medium and purified according to a known procedure.

The amount of the silicon-containing acrylic graft copolymer as the component (c) in the inventive resin composition is in the range from 0.5 to 20 parts by weight or, preferably, from 2 to 10 parts by weight per 100 parts by weight of the organic thermoplastic resin as the component (a). When the amount thereof is too small, the desired effect of melt-dripping prevention is obtained only insufficiently while, when the amount thereof is too large, a great decrease is caused in the mechanical strengths of the shaped articles of the resin composition. It is of course that two kinds or more of different graft copolymers are used in combination as the component (c) provided that the total amount thereof is within the above mentioned range.

In the preparation of a flame retardant resin composition according to the inventive method by compounding the above described essential ingredients and optional additives, it is important that the compounding work of the organic thermoplastic resin and the flame retardant agent is conducted under a controlled temperature in order to avoid inadvertent thermal decomposition of the flame retardant agent since various flame retardant agents have their respectively different thermal decomposition temperatures. For example, the compounding work with some of the phosphate ester compounds cannot be performed at a temperature higher than 200° C. because their thermal decomposition temperature is lower than 200° C. Similarly, the compounding work with aluminum hydroxide should be conducted at a temperature below 200° C. in view of the dehydration temperature thereof.

The compounding work of the essential and optional ingredients to prepare a flame retardant resin composition according to the inventive method can be performed by using a conventional resin processing machine. It is preferable that the organic thermoplastic resin is first compounded with the flame retardant agent or agents as the component (b) prior to compounding with the graft copolymer as the component (c). When two kinds or more of the flame retardant agents are used in combination, the sequential order of introduction thereof into the resin is not particularly limitative to give substantially the identical flame retardant effect. When the combination of the flame retardant agents includes a phosphate ester compound, it is preferable that the phosphate ester compound is first compounded with the synthetic resin prior to compounding of other flame retardant agent because the phosphate ester-based flame retardant agent has an effect as a plasticizer so that the compounding work can be conducted at a lower temperature by virtue of the plasticization of the resin by the phosphate flame retardant agent. It is of course optional that the flame retardant agents to be combined are first mixed together beforehand into the form of a paste which is admixed with the organic thermoplastic resin as the component (a). Introduction of the silicon-containing acrylic graft copolymer usually follows the compounding work of the resin and the flame retardant agent.

Examples of the above mentioned optional known additives include auxiliary flame retardant agents such as red phosphorus, carbon black, titanium dioxide, platinum compounds and the like, stabilizers such as antioxidants, ultraviolet absorbers and aging retarders, reinforcing fillers and so on without particular limitations.

In the following, the method of the invention for imparting flame retardancy to a synthetic resin is described in more detail by way of examples as preceded by the description of the procedure for the preparation of the silicon-containing acrylic graft copolymer as the component (c). In the following description, the term of "parts" always refers to "parts by weight".

Preparation of Silicon-containing Acrylic Graft Copolymers

An aqueous emulsion of a reactive organopolysiloxane was prepared in the following manner. Thus, 1500 parts of octamethyl cyclotetrasiloxane and 1.2 parts of a 3-methacryloxypropyl methyl siloxane were added to 1500 parts of deionized water together with 15 parts of sodium laurylsulfate and 10 parts of dodecylbenzene sulfonic acid and the mixture was emulsified by first agitating with a mixer followed by passing twice through a homogenizer under a pressure of 3000 psi to give a stable aqueous emulsion.

The aqueous emulsion was heated at 70° C. for 12 hours to effect ring-opening polymerization of the octamethyl cyclotetrasiloxane and then cooled to 25° C. to effect aging of the emulsion by keeping at this temperature for 24 hours followed by the adjustment of the pH of the emulsion to 7 by using sodium carbonate. After bubbling of nitrogen gas for 4 hours into the emulsion, the aqueous emulsion was subjected to steam distillation to remove volatile organosiloxane materials. The thus obtained aqueous emulsion was diluted with deionized water so as to adjust the content of the non-volatile matter to 45%. The principal ingredient of the aqueous emulsion, which is referred to as the emulsion E-1 hereinbelow, was an organopolysiloxane of which the content of the 3-methacryloxypropyl groups was 0.03% by moles of all of the silicon-bonded organic groups.

Another aqueous organopolysiloxane emulsion, referred to as the emulsion E-2 hereinbelow, was prepared in substantially the same manner as in the preparation of the emulsion E-1 excepting replacement of 1.2 parts of the 3-methacryloxypropyl methyl siloxane with 98.4 parts of a 3-mercaptopropyl methyl siloxane.

Into a reaction vessel equipped with a stirrer, reflux condenser, thermometer and gas inlet tube were introduced 793 parts of the emulsion E-1 containing 357 parts of the organopolysiloxane and 1206 parts of deionized water and, while the temperature of the thus diluted aqueous emulsion was kept at 30° C., the emulsion under a stream of nitrogen gas was admixed with 0.002 part of iron (II) sulfate heptahydrate, 1.0 part of tert-butyl hydroperoxide, 0.5 part of L-ascorbic acid. Thereafter, while the temperature of the mixture in the reaction vessel was kept also at 30° C., a mixture of 348 parts of methyl methacrylate, 7 parts of 2-hydroxyethyl methacrylate and 2 parts of 1,4-butanediol diacrylate as the grafting monomers was added dropwise into the vessel over a period of 3 hours followed by further continued agitation of the mixture for additional one hour to complete the graft copolymerization reaction. The aqueous emulsion of the graft copolymer thus obtained contained 30% by weight of a non-volatile matter.

In the next place, 1000 parts of the thus obtained aqueous emulsion of the silicon-containing acrylic graft copolymer were heated at 60° C. in a vessel equipped with a stirrer and admixed with an aqueous solution of 92 parts of sodium sulfate in 563 parts of deionized water to precipitate the silicon-containing acrylic graft copolymer by the salting-out effect followed by repeated filtration and washing with water and drying at 60° C. to give a silicon-containing acrylic graft copolymer, referred to as the polymer P-1 hereinbelow.

A second silicon-containing acrylic graft copolymer, referred to as the polymer P-2 hereinbelow, was prepared in substantially the same manner as above excepting an increase of the emulsion E-1 from 793 parts to 1110 parts corresponding to 500 parts of the organopolysiloxane and a decrease of the amount of deionized water from 1206 parts to 1019 parts and replacement of the grafting monomer mixture with another mixture consisting of 204 parts of methyl methacrylate and 11 parts of 1,4-butanediol diacrylate.

A third silicon-containing acrylic graft copolymer, referred to as the polymer P-3 hereinbelow, was prepared in substantially the same manner as in the preparation of the polymer P-1 excepting replacement of 793 parts of the emulsion E-1 with 477 parts of the emulsion E-2 corresponding to 215 parts of the organopolysiloxane, an increase of the amount of deionized water from 1206 parts to 1400 parts, replacement of the grafting monomer mixture with another mixture consisting of 350 parts of methyl methacrylate and 150 parts of ethyl acrylate and decrease of the graft-polymerization temperature from 30° C. to 10° C.

EXAMPLE 1

A mixture consisting of 100 parts of a high-impact polystyrene, 2 parts of the above obtained polymer P-1, 20 parts of triphenyl phosphate and 70 parts of aluminum hydroxide (Heidilite H-42S, a product by Showa Denko Co.) was uniformly kneaded at 180° C. under melting followed by injection molding at a nozzle temperature of 195° C. into test pieces which were subjected to the evaluation test for the flame retardancy by the method specified in the UL-94 Standard. The UL-94 Standard describes the method of combustion testing for classification of materials into three grades of V-0, V-1 and V-2 from the results of the test with five test pieces for each sample. The criteria for the grading are as follows. V-0: Combustion of the burning test pieces does not last for longer than 10 seconds after removal of the flame for ignition of the test pieces with an average time of continued combustion with and/or without flame not exceeding 5 seconds. None of the five test pieces produces dripping particles which may set fire on absorbent cotton. V-1: Combustion of the burning test pieces does not last for longer than 30 seconds after removal of the flame for ignition of the test pieces with an average time of continued combustion with and/or without flame not exceeding 25 seconds. None of the five test pieces produces dripping particles which may set fire on absorbent cotton.

V-2: Combustion of the burning test pieces does not last for longer than 30 seconds after removal of the flame for ignition of the test pieces with an average time of continued combustion with and/or without flame not exceeding 25 seconds. One or more of the five test pieces produces dripping particles which may set fire on absorbent cotton.

The results of the test were that self-extinguishment of the flame took place after 2 seconds from the first flame-contact and after 1 second from the second flame-contact with dripping from none of the five test pieces. The grade was rated as V-0.

EXAMPLE 2

The experimental procedure was substantially the same as in Example 1 except that the resin composition was formulated with 100 parts of a general-purpose polystyrene, 6 parts of the polymer P-1, 25 parts of triphenyl phosphate and 80 parts of the same aluminum hydroxide powder.

The results of the test were that self-extinguishment of the flame took place after 3 seconds from the first flame-contact and after 2 seconds from the second flame-contact with dripping from none of the five test pieces. The grade was rated as V-0.

EXAMPLE 3

The experimental procedure was substantially the same as in Example 2 excepting replacement of the polymer P-1 with the same amount of the polymer P-2.

The results of the test were that self-extinguishment of the flame took place after 4 seconds from the first flame-contact and after 1 second from the second flame-contact with dripping from none of the five test pieces. The grade was rated as V-0.

EXAMPLE 4

The experimental procedure was substantially the same as in Example 2 excepting replacement of the polymer P-1 with the same amount of the polymer P-3.

The results of the test were that self-extinguishment of the flame took place after 2 seconds from the first flame-contact and after 2 seconds from the second flame-contact with dripping from none of the five test pieces. The grade was rated as V-0.

COMPARATIVE EXAMPLE 1

The experimental procedure was substantially the same as in Example 1 excepting omission of the polymer P-1 in the formulation of the resin composition.

The results of the test were that self-extinguishment of the flame took place after 7 seconds from the first flame-contact but the combustion lasted for 19 seconds after the second flame-contact with dripping from four of the five test pieces. The grade was rated as V-2.

COMPARATIVE EXAMPLE 2

The experimental procedure was substantially the same as in Example 2 excepting omission of the polymer P-1 in the formulation of the resin composition.

The results of the test were that self-extinguishment of the flame took place after 6 seconds from the first flame-contact but the combustion lasted for 6 seconds after the second flame-contact with dripping from all of the five test pieces. The grade was rated as V-2.

COMPARATIVE EXAMPLE 3

The experimental procedure was substantially the same as in Example 1 excepting replacement of the polymer P-1 in the formulation of the resin composition with the same amount of a dimethyl polysiloxane fluid having an average degree of 10,000.

The results of the test were that self-extinguishment of the flame took place after 16 seconds from the first flame-contact but the combustion lasted for 35 seconds after the second flame-contact with dripping from all of the five test pieces. This result is poorer than the grade of V-2.

What is claimed is:

1. A method for imparting flame retardancy to a synthetic resin to give a flame-retardant resin composition, which comprises uniformly blending:

(a) 100 parts by weight of the synthetic resin; with (b) from 1 to 50 parts by weight of a flame retardant agent; and (c) from 0.5 to 20 parts by weight of an organosilicone group-containing acrylic resin, which is a graft copolymer of (A) an organopolysiloxane having an average degree of polymerization in the range from 500–8,000 represented by the average unit formula $$R^1_a R^2_b SiO_{(4-a-b)/2},$$

in which $R^1$ is a monovalent organic group having a radical-reactive group or a mercpato group, $R^2$ is a hydrogen atom or a monovalent hydrocarbon group having 1 to 20 carbon atoms free from a radical-reactive group or a mercpato group, the subscript a is a positive number in the range from 0.001 to 1.0 and the subscript b is a positive number with the proviso that a+b is in the range from 1.95 to 3.00; and (B) an ester of (meth)acrylic acid represented by the general formula $$CH_2=CR^3-CO-O-R^4,$$

in which $R^3$ is a hydrogen atom or a methyl group and $R^4$ is an alkyl group or alkoxy-substituted alkyl group having 1 to 18 carbon atoms, in a weight ratio of (A):(B) in the range from 5:95 to 95:5.

2. The method for imparting flame retardancy to a synthetic resin as claimed in claim 1 in which the flame retardant agent as the component (b) is a phosphate compound selected from the group consisting of triphenyl phosphate, tricresyl phosphate, cresyl diphenyl phosphate and ammonium polyphosphate.

3. The method for imparting flame retardancy to a synthetic resin as claimed in claim 1 in which the radical-reactive group in the organic group denoted by $R^1$ is selected from the group consisting of vinyl group, allyl group and 3-(meth)acryloxypropyl group.

4. The method for imparting flame retardancy to a synthetic resin as claimed in claim I in which the synthetic resin is uniformly blended, in addition to the components (b) and (c) with an auxiliary flame retardant agent selected from the group consisting of metal hydroxides, metal oxides, calcium aluminate and calcium carbonate in an amount in the range from 30 to 80 parts by weight per 100 parts by weight of the synthetic resin.

5. The method for imparting flame retardancy to a synthetic resin as claimed in claim 4 in which the auxiliary flame retardant agent is aluminum hydroxide or magnesium hydroxide.

6. The method for imparting flame retardancy to a synthetic resin as claimed in claim I in which the weight ratio of (A):(B) is in the range from 20:80 to 80:20.

* * * * *